US006707963B2

United States Patent
Kawarai (10) Patent No.: US 6,707,963 B2
(45) Date of Patent: Mar. 16, 2004

(54) WAVELENGTH DIVISION MULTIPLEXING APPARATUS

(75) Inventor: Masashige Kawarai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 91 days.

(21) Appl. No.: 10/028,278

(22) Filed: Dec. 28, 2001

(65) Prior Publication Data

US 2002/0061165 A1 May 23, 2002

Related U.S. Application Data

(63) Continuation of application No. PCT/JP99/04534, filed on Aug. 23, 1999.

(51) Int. Cl.[7] .............................. G02B 6/28; G02B 6/293
(52) U.S. Cl. ............................ 385/24; 385/16; 398/178
(58) Field of Search ......................... 385/16, 17, 24, 385/140; 359/115, 124–128, 132–134, 187; 398/43, 45, 48–51, 178

(56) References Cited

U.S. PATENT DOCUMENTS

| | | | | |
|---|---|---|---|---|
| 5,923,450 A | * | 7/1999 | Dugan et al. | 359/127 |
| 6,031,659 A | * | 2/2000 | Okiyama | 359/134 |
| 6,271,945 B1 | * | 8/2001 | Terahara | 359/124 |

FOREIGN PATENT DOCUMENTS

| | | | | |
|---|---|---|---|---|
| EP | 0 743 768 A1 | * | 11/1996 | H04J/1/00 |
| EP | 0844751 A2 | * | 5/1998 | H04B/10/18 |
| JP | 4-44431 | | 2/1992 | |
| JP | 5-136735 | | 6/1993 | |
| JP | 6188517 | | 7/1994 | |
| JP | 06-188517 A | * | 7/1994 | H04J/14/02 |
| JP | 7-30520 | | 1/1995 | |
| JP | 07-030520 A | * | 1/1995 | H04J/14/00 |
| JP | 8-293853 | | 11/1996 | |
| JP | 9-261205 | | 10/1997 | |
| JP | 10210008 | | 8/1998 | |
| JP | 10-210008 A | * | 8/1998 | H04J/14/00 |
| JP | 11-126940 | | 5/1999 | |
| JP | 11-196068 | | 7/1999 | |
| JP | 11-205289 | | 7/1999 | |

* cited by examiner

Primary Examiner—Akm Enayet Ullah
Assistant Examiner—Michelle R. Connelly-Cushwa
(74) Attorney, Agent, or Firm—Staas & Halsey LLP (57) ABSTRACT

Disclosed is a wavelength division multiplexing apparatus comprising a plurality of variable attenuators (12) which respectively attenuate a plurality of optical signals of different wavelengths with variable amounts of attenuation, an optical combiner (14) which combines optical outputs of the plurality of variable attenuators, and an optical amplifier (16) which optically amplifies an optical output of the optical combiner, wherein in order to prevent light leaking from an unused wavelength from affecting the optical amplification of wavelengths in use, an optical switch (46) is provided in front of each variable attenuator and, for the unused wavelength, the optical switch is switched to the attenuation film side to secure a sufficient amount of attenuation.

7 Claims, 9 Drawing Sheets

Fig.1

PRIOR ART

PRIOR ART

WAVELENGTH DIVISION MULTIPLEXING APPARATUS

CROSS-REFERENCE TO RELATED APPLICATIONS

This application is a continuation of PCT/JP99/04534 filed Aug. 23, 1999.

TECHNICAL FIELD

The present invention relates to a wavelength division multiplexing (WDM) apparatus that combines a plurality of optical signals of different wavelengths and optically amplifies the combined signal. WDM apparatuses are classified into two types: a non-transponder type which takes as inputs a plurality of narrowband optical signals of different wavelengths, combines them together, and optically amplifies the combined signal; and a transponder type which has at its front end a plurality of transponders that respectively convert a plurality of wideband optical signals of the same wavelength into a plurality of narrowband optical signals of different wavelengths. The present invention concerns both types of WDM apparatus.

BACKGROUND ART

A prior art non-transponder-type WDM apparatus comprises a plurality of variable attenuators which respectively attenuate a plurality of optical signals of different wavelengths with variable attenuation ratios, an optical combiner which combines the optical outputs of the attenuators, and an optical amplifier which optically amplifies the optical output of the optical combiner. The spectrum of the output light is measured with a spectrum analyzer unit and, based on the result of the measurement, each individual variable attenuator is controlled to suppress a variation (tilt) in the output level of each wavelength. If a wavelength deviation greater than an allowable level is detected from the result of the spectrum measurement, the amount of attenuation for that wavelength is set to a maximum to prevent it from affecting its adjacent wavelengths. In a transponder-type WDM apparatus, the plurality of variable attenuators are preceded by a plurality of transponders that respectively convert a plurality of optical signals of the same wavelength into a plurality of optical signals of different wavelengths. The prior art non-transponder-type WDM apparatus and transponder-type WDM apparatus will be described in detail, later, with reference to the drawings.

When there is an unused wavelength in the plurality of wavelengths, that is, when unmodulated light is input, such an unused wavelength must be attenuated sufficiently (to about 50 dB) to prevent it from affecting the optical amplification of the other wavelengths in use. However, in the above prior art WDM apparatus, since the amount of attenuation that each optical attenuator can provide is about 20 dB at maximum, light leaking from the unused wavelength is also amplified together with the optical signals in use. The resulting problem is that the optical power of the optical signals, in use, may degrade, leading to a main signal error. This problem becomes particularly pronounced when the number of wavelengths in use is small.

A second problem with the prior art WDM apparatus concerns the accuracy of each wavelength in the output light. As earlier noted, in the prior art, wavelength deviation of each wavelength is monitored with a spectrum analyzer, with provisions made so that if a wavelength deviation greater than an allowable level is detected for any wavelength, the amount of attenuation for that wavelength is set to a maximum to prevent it from affecting its adjacent wavelengths. However, the spectrum analyzer has the problem that its wavelength resolution is poor and measurements cannot be made with high accuracy. Another problem is that since the wavelength is swept, it takes several tens of seconds from the time a wavelength deviation occurs until the time it is detected, this giving rise to the possibility that an error may be caused in adjacent wavelengths during that time.

DISCLOSURE OF THE INVENTION

Accordingly, a first object of the present invention is to provide a WDM apparatus that is not affected by light leaking from an unused wavelength.

A second object of the present invention is to provide a WDM apparatus that can take corrective action by quickly and accurately detecting a wavelength deviation.

The first object is achieved by the wavelength division multiplexing apparatus of the invention comprising: a plurality of variable attenuators to which a plurality of optical signals of different wavelengths are respectively input, and which respectively attenuate the input optical signals with variable amounts of attenuation; an optical combiner which combines optical outputs of the plurality of variable attenuators; an optical amplifier which optically amplifies an optical output of the optical combiner; a spectrum analyzer unit which measures the spectrum of an optical output of the optical amplifier, and controls each of the plurality of variable attenuators so as to maintain the optical power level of each wavelength at a predetermined level in accordance with the result of the measurement; and optical shutoff means for shutting off an input of an optical signal of a wavelength not used among the plurality of optical signals.

The second object is achieved by the wavelength division multiplexing apparatus of the invention comprising: a plurality of transponders which respectively convert a plurality of optical signals of the same wavelength into a plurality of optical signals of different wavelengths; a plurality of variable attenuators to which the plurality of optical signals of different wavelengths are respectively input, and which respectively attenuate the input optical signals with variable amounts of attenuation; an optical combiner which combines optical outputs of the plurality of variable attenuators; an optical amplifier which optically amplifies an optical output of the optical combiner; a wavelength monitoring device, provided between the transponders and the variable attenuators, for monitoring each optical signal for wavelength deviation; and a controller which sets the amount of attenuation to a maximum value for the optical attenuator corresponding to the optical signal that has been detected by the wavelength monitoring device as having a wavelength deviation greater than a predetermined value.

BEST MODE FOR CARRYING OUT THE INVENTION

Before proceeding to the description of the present invention, prior art WDM apparatuses will be described with reference to drawings.

Figure 1:
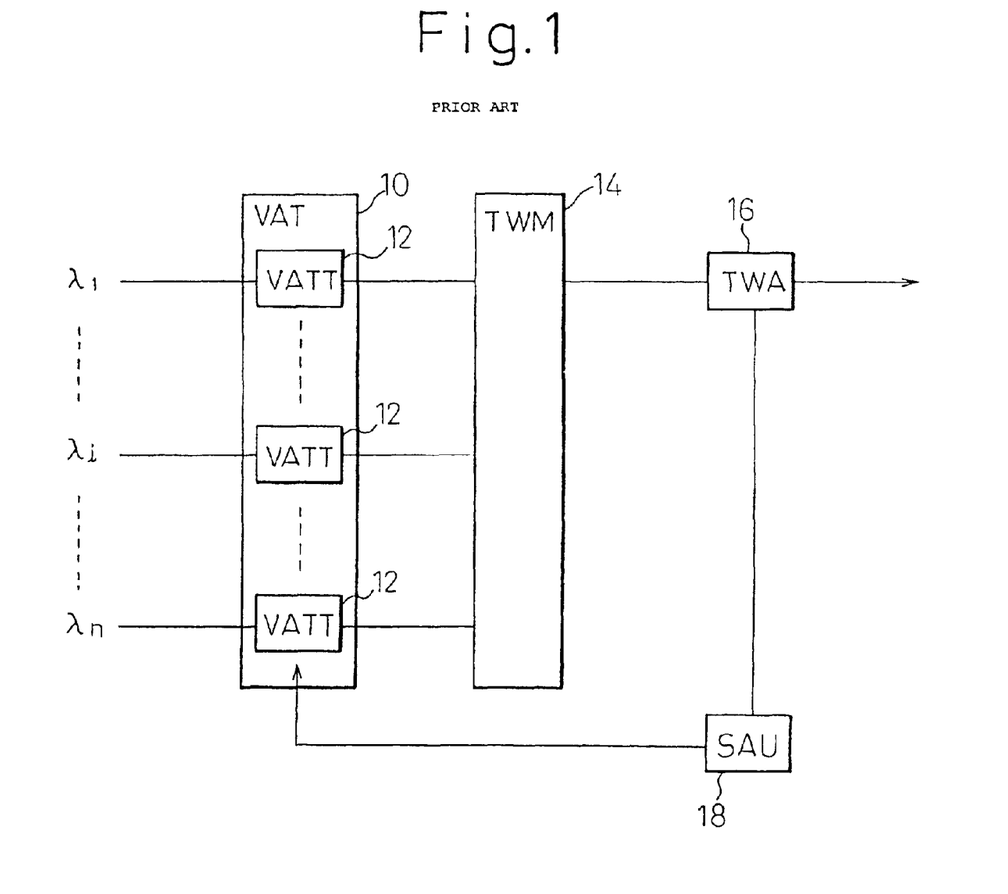
FIG. 1 is a block diagram of a non-transponder-type WDM apparatus according to the prior art.

FIG. 1 shows the configuration of a non-transponder-type WDM apparatus according to the prior art. An optical variable attenuation section (VAT) 10 includes a number, n, of optical variable attenuators (VATTS) 12. Optical signals of different wavelengths $\lambda_1, \ldots, \lambda_1, \ldots, \lambda_n$ are input to the respective optical variable attenuators 12. Outputs of the optical variable attenuators 12 are combined in a transmitting wave multiplexer (TWM) 14 and optically amplified in a transmitting wave amplifier (TWA) 16. A spectrum analyzer unit (SAU) 18 measures the spectrum of the optical output of the TWA 16 and outputs a signal to control each VATT 12 so that the optical power level of each wavelength will be maintained at a predetermined level. If a wavelength deviation greater than an allowable level is detected, the amount of attenuation in the corresponding VATT 12 is set to a maximum.

Figure 2:
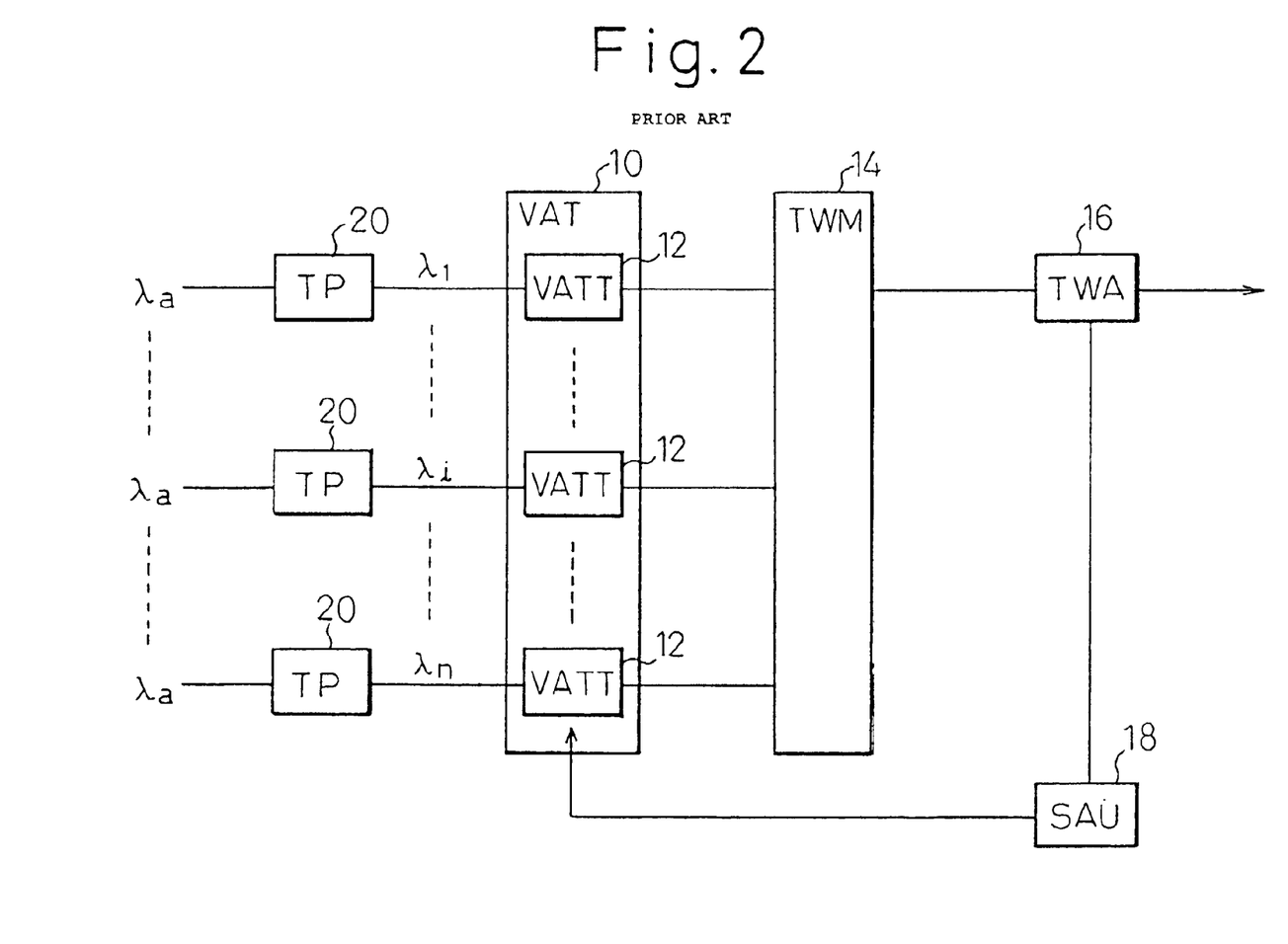
FIG. 2 is a block diagram of a transponder-type WDM apparatus according to the prior art.

FIG. 2 shows the configuration of a transponder-type WDM apparatus according to the prior art. The same constituent elements as those in FIG. 1 are designated by the same reference numerals, and their descriptions will not be repeated. In the transponder-type WDM apparatus, the number, n, of transponders (TPs) 20, which respectively convert the number, n, of relatively wideband optical signals of equal wavelength $\lambda_a$ into the number, n, of narrowband optical signals of different wavelengths $\lambda_1, \ldots, \lambda_1, \ldots, \lambda_n$, are arranged in front of the VAT 10.

Figure 3:
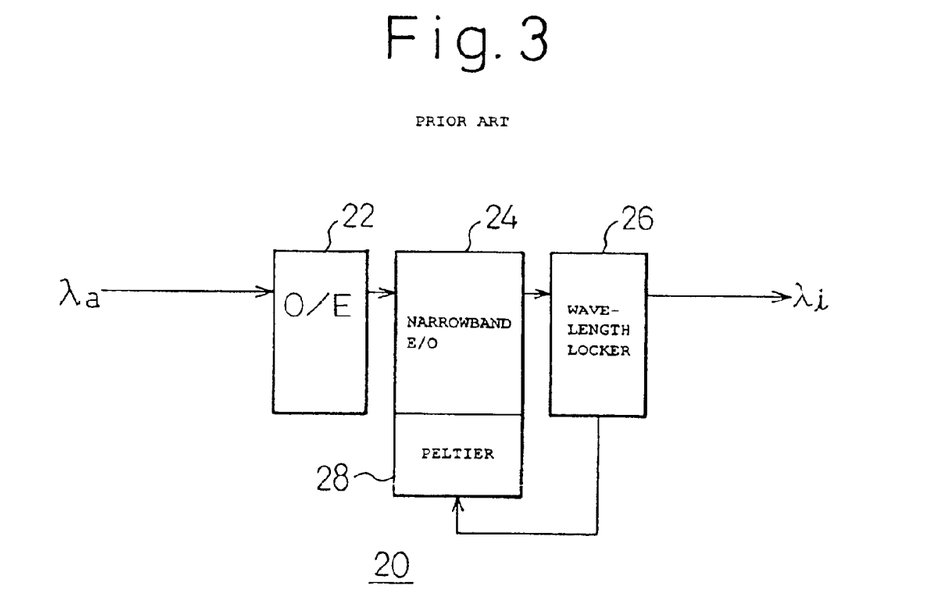
FIG. 3 is a block diagram showing the details of a transponder.

FIG. 3 shows the details of each TP 20. The input optical signal of wavelength $\lambda_a$ is first converted by an optical-to-electrical converter 22 into an electrical signal, and then converted by a narrowband electrical-to-optical converter (narrowband laser diode) 24 into an optical signal of wavelength $\lambda_i$. Since the laser diode has the property that its oscillation frequency changes with changing temperature, the wavelength of the optical output is controlled by heating or cooling the laser diode with a Peltier element 28. A wavelength locker 26 monitors the wavelength of the optical output, and supplies the appropriate control signal to the Peltier element 28 to lock the wavelength of the optical output at a predetermined value.

Figure 4:
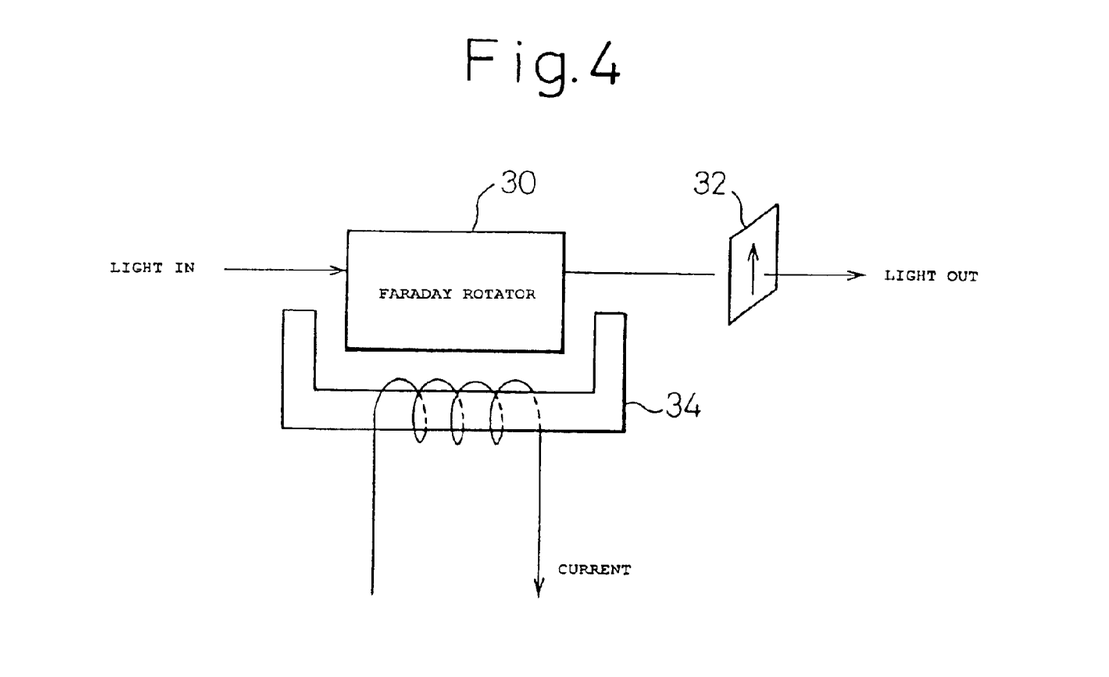
FIG. 4 is a diagram showing one example of an optical variable attenuator.

FIG. 4 shows an optical variable attenuator using a Faraday rotator, as one example of the VATT. In FIG. 4, input light is passed through the Faraday rotator 30 and output via a polarizer 32. An electromagnet 34 is energized to apply a magnetic field to the Faraday rotator 30 in a direction parallel to its optical axis. By varying the current flowing through the electromagnet 34, the strength of the magnetic field developed in the direction parallel to the optical axis of the Faraday rotator 30 varies, thereby rotating the plane of polarization of the light passing through the Faraday rotator. When the plane of polarization of the light incident on the polarizer 32 coincides with the polarization axis of the polarizer 32, the output of the light passing through the polarizer 32 reaches a maximum, while when the former is at right angles to the latter, the light output is a minimum.

Figure 5:
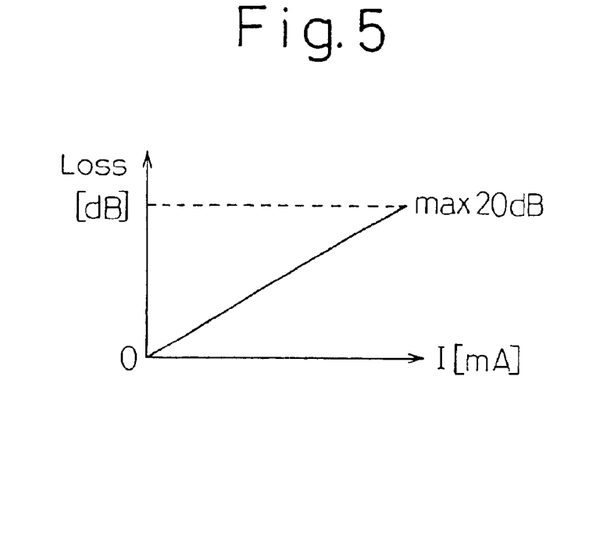
FIG. 5 is a graph showing the relationship between current and attenuation amount in the optical variable attenuator of FIG. 4.

FIG. 5 shows the relationship between the current and the amount of attenuation in the optical variable attenuator of FIG. 4. As can be seen from the figure, the amount of attenuation that the optical variable attenuator of the type shown in FIG. 4 can achieve is 20 dB at maximum.

Figure 6:
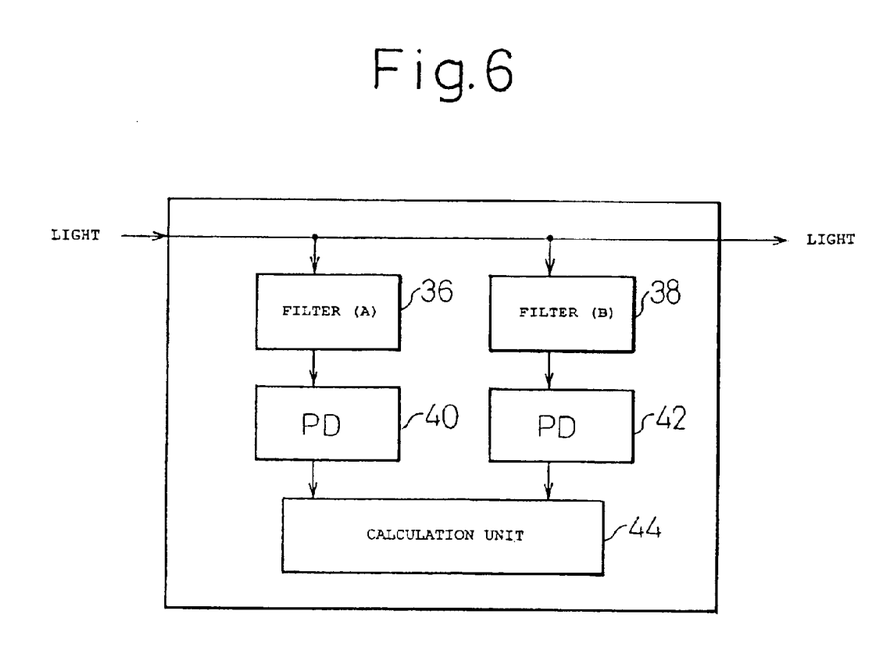
FIG. 6 is a block diagram showing the details of a wavelength locker.

FIG. 6 shows the details of the wavelength locker 26 contained in the transponder of FIG. 3. In FIG. 6, part of the input light is separated and transmitted through optical filters 36 and 38, and the transmitted light is detected by photodiodes 40 and 42 which then supply their detection results to a calculation unit 44.

Figure 7A:
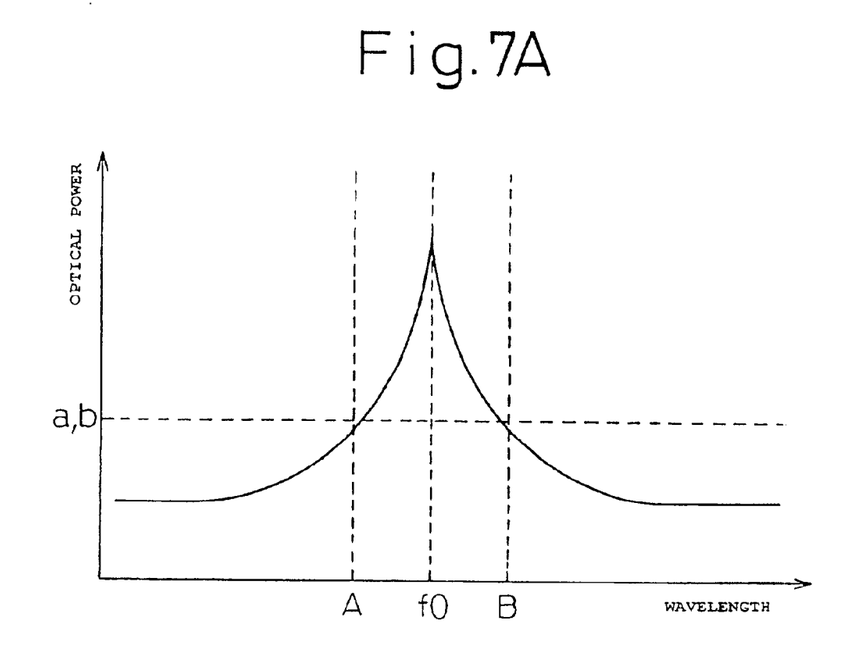
FIGS. 7A and 7B are diagrams for explaining the operation of the wavelength locker.
Figure 7B:
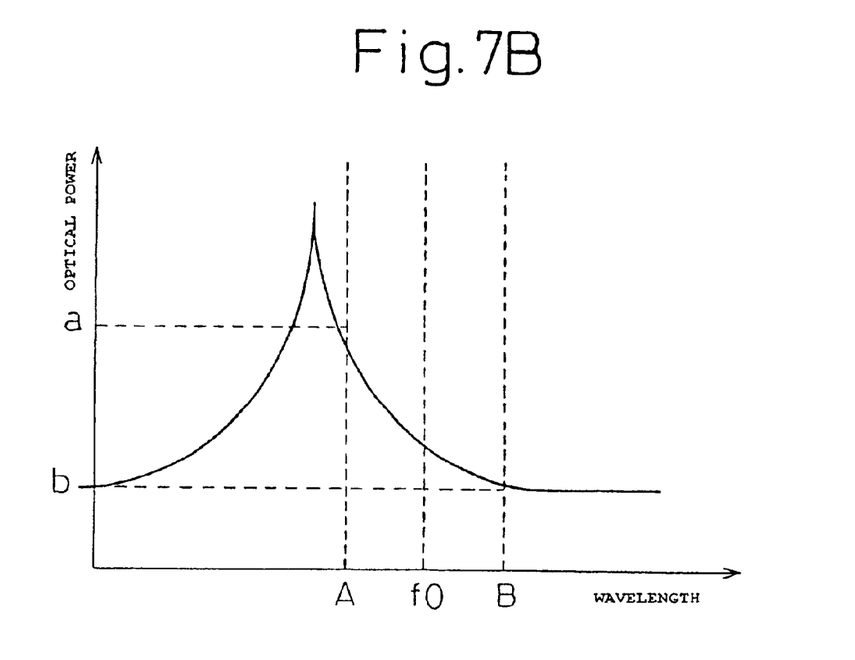

The optical filters 36 and 38 have wavelength characteristics centered about $f_0$ minus several tens of ppm (indicated by "A" in FIGS. 7A and 7B) and $f_0$ plus several tens of ppm (indicated by "B" in FIGS. 7A and 7B), respectively, where $f_0$ is the desired wavelength. When the wavelength of the signal light coincides with the desired wavelength $f_0$, the light intensities at the transmission wavelengths A and B of the filters 36 and 38 are equal to each other, as shown in FIG. 7A, that is, the optical power a of the light transmitted through the filter 36 is equal to the optical power b of the light transmitted through the filter 38, and hence, a−b=0. On the other hand, when the wavelength of the signal light is shorter than $f_0$, then a>b, as shown in FIG. 7B, and hence, (a−b)>0. Similarly, when the wavelength of the signal light is longer than $f_0$, then a<b, and hence, (a−b)<0. By controlling the current fed to the Peltier element 28 in accordance with the value of (a−b), the wavelength of the signal light can be locked at $f_0$.

Figure 8:
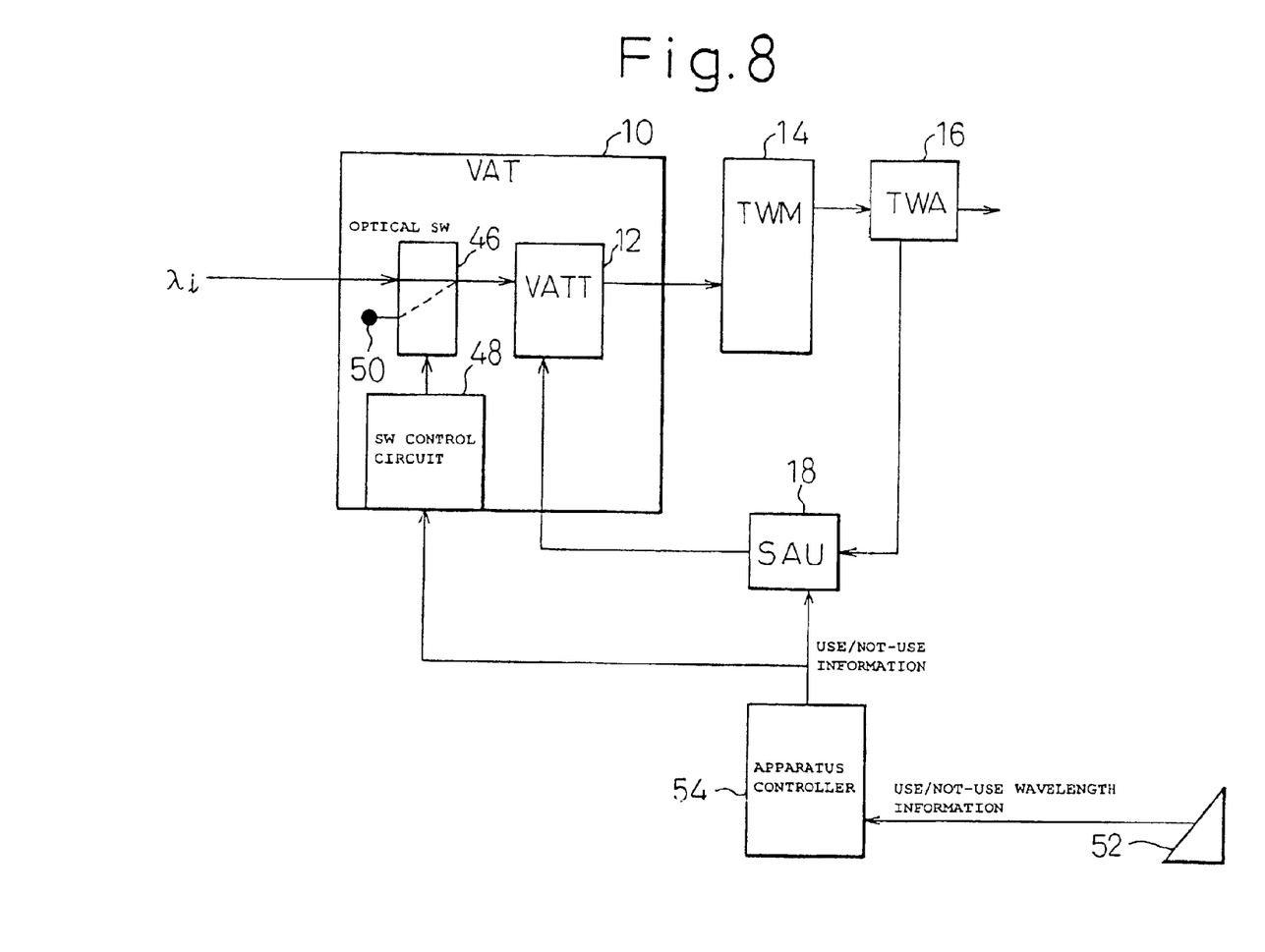
FIG. 8 is a block diagram showing a first embodiment of the present invention.

FIG. 8 shows the configuration of a WDM apparatus according to a first embodiment of the present invention. The same constituent elements as those in FIG. 1 are designated by the same reference numerals, and their descriptions will not be repeated. Of the plurality of VATTs for wavelengths $\lambda_1, \ldots, \lambda_1, \ldots, \lambda_n$, only the VATT 12 for $\lambda_1$ is shown in FIG. 8.

In the embodiment shown in FIG. 8, the VATT 12 is preceded by an optical switch 46. The optical switch 46, under the control of a switch control circuit 48, selects either the optical signal input of wavelength $\lambda_1$ or an attenuation film 50, and couples the selected input to the VATT 12. When the optical switch 46 selects the attenuation film 50, an attenuation amount of 50 dB or greater can be obtained. For each wavelength, a setting as to whether to use or not to use the wavelength is entered from a maintenance console 52. An apparatus controller 54 sends the use/not-use information, entered from the maintenance console 52, to the SAU 18 as well as to the switch control circuit 48. The SAU 18 sets the amount of attenuation to a maximum value for the VATT 12 corresponding to the wavelength that has been set to not-use. When the corresponding wavelength has been set to not-use, the switch control circuit 48 controls the optical switch 46 so as to select the attenuation film. In this way, an attenuation amount of 50 dB or greater is secured for the wavelength not used.

For the optical switch 46, use can be made of a mechanical switch that mechanically switches the optical path or of a temperature-controlled optical switch that switches the waveguide by utilizing temperature.

The embodiment of FIG. 8 has been described for the non-transponder-type WDM apparatus, but it will be appreciated that the embodiment is also applicable to the transponder-type WDM apparatus that has transponders at its front end.

Figure 9:
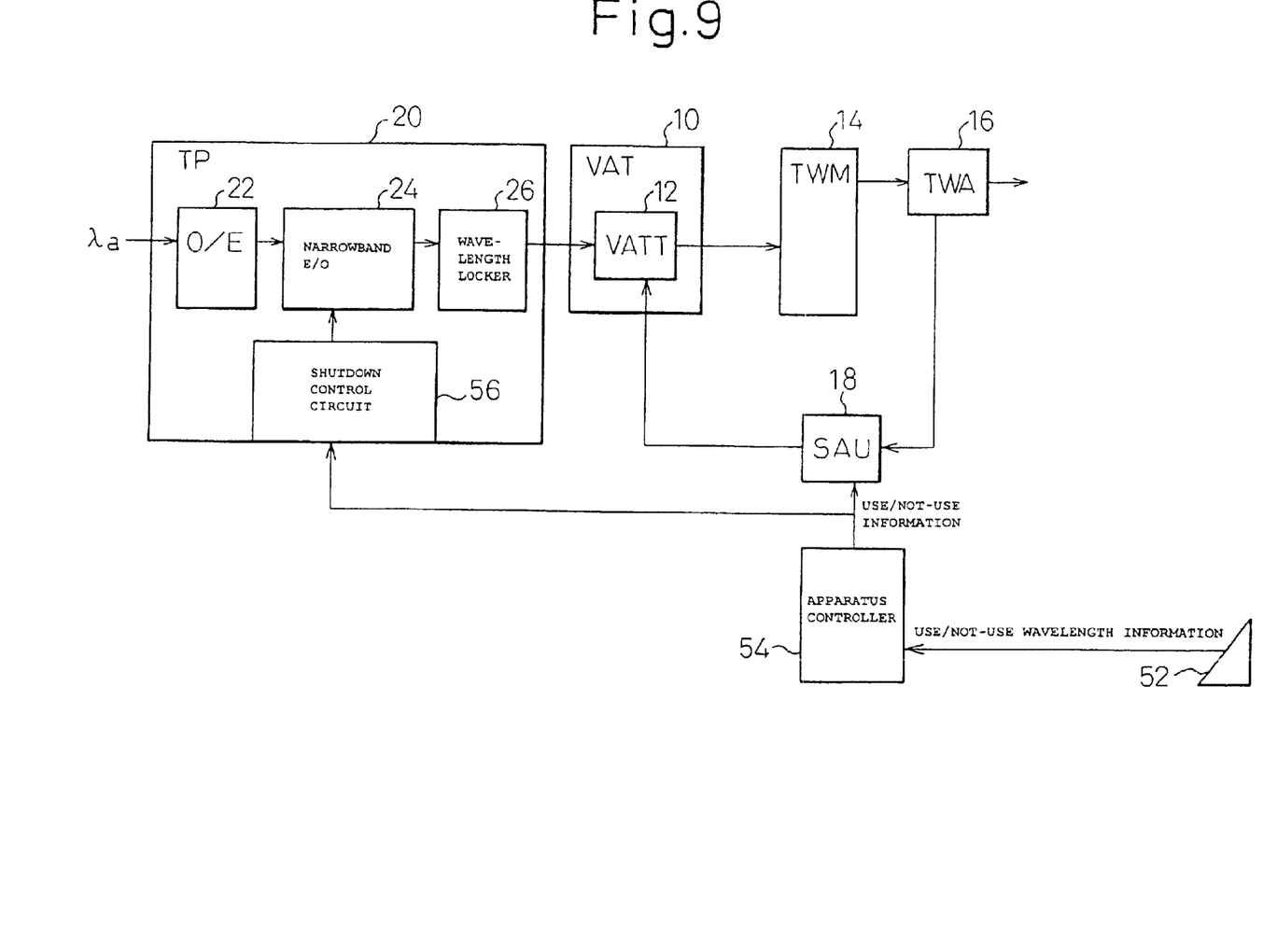
FIG. 9 is a block diagram showing a second embodiment of the present invention.

FIG. 9 shows a second embodiment of the present invention. In the WDM apparatus of FIG. 9, the optical switch 46 in FIG. 8 is replaced by a shutdown control circuit 56 which has the function of shutting down the narrowband E/O 24 contained in the transponder 20. When it is reported from the apparatus controller 54 that the corresponding wavelength has been set to not-use, the shutdown control circuit 56 shuts down the narrowband E/O 24 to provide an attenuation amount of 50 dB or greater.

Figure 10:
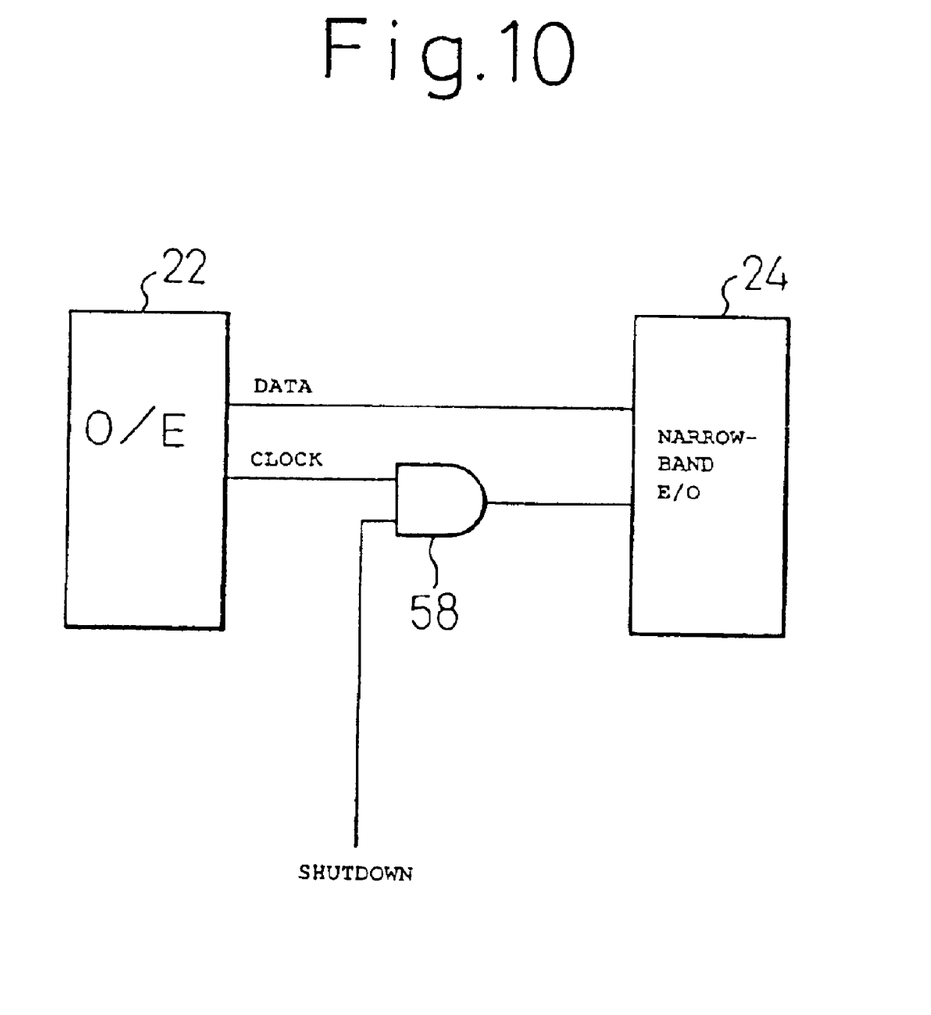
FIG. 10 is a diagram showing one example of shutdown control.

FIG. 10 shows an example of how the shutdown control of the narrowband E/O 24 is accomplished. Of the data and clock regenerated by the O/E 22, the clock is coupled to the narrowband E/O 24 via an AND gate 58. When a shutdown signal is applied, the AND gate 58 is closed, thus stopping the clock and thereby shutting down the narrowband E/O 24.

Figure 11:
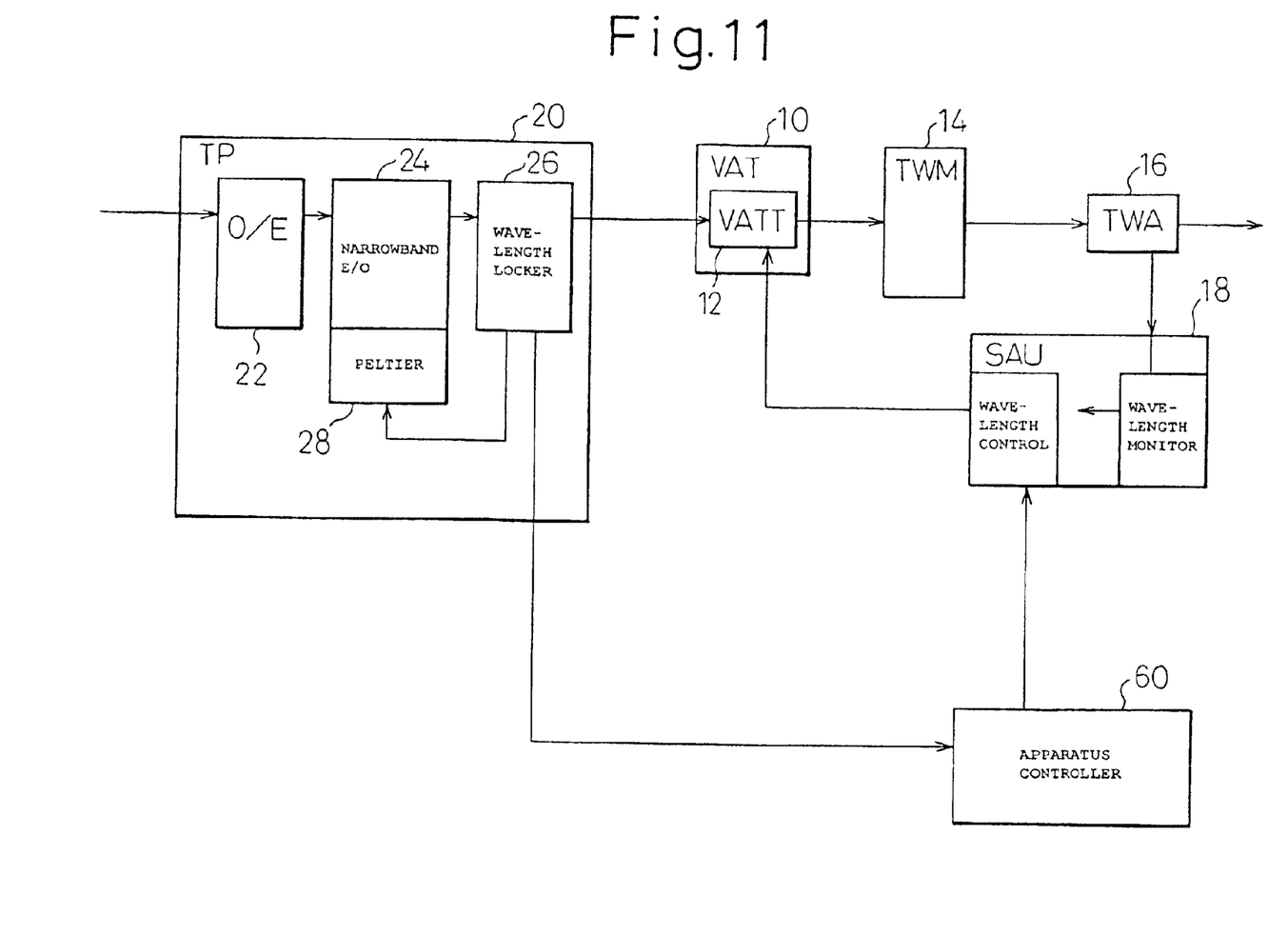
FIG. 11 is a block diagram showing a third embodiment of the present invention.

FIG. 11 shows a WDM apparatus according to a third embodiment of the present invention, which can take corrective action by quickly and accurately detecting a wavelength deviation. As previously described, the SAU 18 monitors the spectrum of the output light and, if a wavelength deviation is detected, sets the amount of attenuation maximum for that wavelength. To detect a wavelength deviation accurately and quickly, the third embodiment of the present invention uses, in addition to the above-described control, the detection of a wavelength deviation performed in the wavelength locker 26. More specifically, as explained with reference to FIGS. 6, 7A, and 7B, the absolute value of (a–b), i.e., the difference between the optical power of the light transmitted through the optical filter 36 and that of the light transmitted through the optical filter 38, represents the magnitude of the wavelength deviation. The apparatus controller 60 receives this value from the wavelength locker 26 and, if this value exceeds a predetermined value, then determines that the wavelength deviation has exceeded the allowable level and instructs the SAU 18 to set the amount of attenuation in the corresponding VATT 12 to a maximum value.

What is claimed is:

1. A wavelength division multiplexing apparatus comprising:
   a plurality of variable attenuators to which a plurality of optical signals of different wavelengths are respectively input, and which respectively attenuate the input optical signals with variable amounts of attenuation;
   an optical combiner which combines optical outputs of the plurality of variable attenuators;
   an optical amplifier which optically amplifies an optical output of the optical combiner;
   a spectrum analyzer unit which measures the spectrum of an optical output of the optical amplifier, and controls each of the plurality of variable attenuators so as to maintain the optical power level of each wavelength at a predetermined level in accordance with the result of the measurement;
   means for externally setting a wavelength not used among the plurality of optical signals;
   optical shutoff means for shutting off an input of an optical signal of a the wavelength not used among the plurality of optical signals.

2. The wavelength division multiplexing apparatus according to claim 1, wherein the optical shutoff means includes an optical switch provided at an input of each of the variable attenuators.

3. The wavelength division multiplexing apparatus according to claim 1, further comprising:
   a transponder that includes a plurality of optical-to-electrical converters which respectively convert a plurality of optical signals of the same wavelength into a plurality of electrical signals and a plurality of electrical-to-optical converters which respectively convert the plurality of electrical signals into a plurality of optical signals of different wavelengths, and wherein,
   the optical shutoff means includes a shutdown control circuit which selectively shuts down the plurality of electrical-to-optical converters.

4. A wavelength division multiplexing apparatus comprising:
   a plurality of transponders which respectively convert a plurality of optical signals of the same wavelength into a plurality of optical signals of different wavelengths;
   a plurality of variable attenuators to which the plurality of optical signals of different wavelengths are respectively input, and which respectively attenuate the input optical signals with variable amounts of attenuation;
   an optical combiner which combines optical outputs of the plurality of variable attenuators;
   an optical amplifier which optically amplifies an optical output of the optical combiner;
   a wavelength monitoring device, provided between the transponders and the variable attenuators, for monitoring each optical signal for a wavelength deviation; and
   a controller which sets the amount of attenuation to a maximum value for the optical attenuator corresponding to the optical signal that has been detected by the wavelength monitoring device as having a wavelength deviation greater than a predetermined value.

5. A wavelength division multiplexing apparatus, comprising:
   a plurality of attenuators to which a plurality of optical signals of different wavelengths are respectively input, and which respectively attenuate the input optical signals with variable amounts of attenuation;
   an optical combiner which combines optical outputs of the attenuators;
   an optical amplifier which optically amplifies an optical output of the optical combiner;
   a setting unit to allow external designation of a wavelength not to be used among the plurality of optical signals; and
   an optical shutoff device to shut off an input of an optical signal of the wavelength not used among the plurality of optical signals.

6. The wavelength division multiplexing apparatus according to claim 5, wherein the optical shutoff device comprises:
   an optical switch provided at an input of each of the variable attenuators.

7. The wavelength division multiplexing apparatus according to claim 5, further comprising:
   a transponder that includes a plurality of optical-to-electrical converters which respectively convert a plurality of optical signals of the same wavelength into a plurality of electrical signals and a plurality of electrical-to-Optical converters which respectively convert the plurality of electrical signals into a plurality of optical signals of different wavelengths, and wherein,
   the optical shutoff device includes a shutdown control circuit which selectively shuts down the plurality of electrical-to-optical converters.

* * * * *

UNITED STATES PATENT AND TRADEMARK OFFICE
CERTIFICATE OF CORRECTION

PATENT NO. : 6,707,963 B2
APPLICATION NO. : 10/028278
DATED : March 16, 2004
INVENTOR(S) : Masashige Kawarai It is certified that error appears in the above-identified patent and that said Letters Patent is hereby corrected as shown below:

Col. 5, line 60, delete "a".

Col. 6, line 60, change "Optical" to --optical--.

Signed and Sealed this

Eighth Day of January, 2008

JON W. DUDAS
*Director of the United States Patent and Trademark Office*